(12) United States Patent
Zheng et al.

(10) Patent No.: US 8,818,208 B2
(45) Date of Patent: Aug. 26, 2014

(54) LASER MUX ASSEMBLY FOR PROVIDING A SELECTED WAVELENGTH

(75) Inventors: Jun Zheng, Missouri City, TX (US); Stefan J. Murry, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 135 days.

(21) Appl. No.: 13/359,847

(22) Filed: Jan. 27, 2012

(65) Prior Publication Data

US 2013/0016972 A1    Jan. 17, 2013

Related U.S. Application Data

(60) Provisional application No. 61/508,017, filed on Jul. 14, 2011.

(51) Int. Cl.
    *H04B 10/06*    (2006.01)
(52) U.S. Cl.
    USPC .............................. 398/201; 372/97; 372/20
(58) Field of Classification Search
    None
    See application file for complete search history.

(56) References Cited

U.S. PATENT DOCUMENTS

| | | |
|---|---|---|
| 7,965,949 B1 | 6/2011 | Wach |
| 2001/0017960 A1 | 8/2001 | Terahara |
| 2006/0215713 A1 | 9/2006 | Flanders et al. |
| 2007/0133647 A1 | 6/2007 | Daiber |
| 2007/0223552 A1 | 9/2007 | Muendel et al. |
| 2008/0259972 A1 | 10/2008 | Heanue et al. |
| 2008/0267246 A1 | 10/2008 | Volodin et al. |
| 2010/0266283 A1* | 10/2010 | Beckett ........................ 398/68 |
| 2011/0135309 A1 | 6/2011 | Lee et al. |
| 2011/0216789 A1* | 9/2011 | Docter et al. ................. 372/20 |

OTHER PUBLICATIONS

PCT International Search Report and Written Opinion dated Oct. 5, 2012 received in related PCT Application No. PCT/US2012/046902, 9 pgs.
PCT International Search Report and Written Opinion dated Oct. 22, 2012 received in related PCT Application No. PCT/US2012/046912, 8 pgs.
Lee, San-Liang et al, "Trend and Applications of Tunable Semiconductor Lasers", Optoelectronic Materials and Devices II, Proc. of SPIE vol. 6782, 67821H, 2007, Taipei, Taiwan R.O.C., 10 pgs.

\* cited by examiner

*Primary Examiner* — Ken Vanderpuye
*Assistant Examiner* — Merlin Brito Peguero
(74) *Attorney, Agent, or Firm* — Grossman Tucker Perreault & Pfleger, PLLC; Norman S. Kinsella (57) ABSTRACT

A laser mux assembly generally includes a back reflector selectively coupled to one of the input ports of an optical multiplexer, such as an arrayed waveguide grating (AWG), and at least one laser emitter coupled to an output port. The laser emitter may include a gain region that emits light across a plurality of wavelengths including, for example, channel wavelengths in an optical communication system. The emitted light is coupled into the output port and the AWG or optical multiplexer filters the emitted light from the laser emitter at different channel wavelengths. The back reflector reflects the filtered light at the respective channel wavelength such that lasing occurs at the channel wavelength(s) of the reflected, filtered light. The laser mux assembly may be used, for example, in a tunable transmitter, to generate an optical signal at a selected channel wavelength.

19 Claims, 5 Drawing Sheets

FIG. 8 ns utilizing different frequencies to carry different signals, fiber optic communications networks may increase the amount of information carried on a single optical fiber by multiplexing different optical signals on different wavelengths using wavelength division multiplexing (WDM).

LASER MUX ASSEMBLY FOR PROVIDING A SELECTED WAVELENGTH

CROSS-REFERENCE TO RELATED APPLICATIONS

The present application claims the benefit of U.S. Provisional Patent Application Ser. No. 61/508,017 filed on Jul. 14, 2011, which is fully incorporated herein by reference.

TECHNICAL FIELD

The present disclosure relates to wavelength division multiplexed (WDM) optical systems, networks, and methods and more particularly, to a laser mux assembly for providing a selected wavelength.

BACKGROUND INFORMATION

Optical communications networks have been deployed for many years. Originally, these networks were generally "point to point" type networks including a transmitter and a receiver connected by an optical fiber. Such networks are relatively easy to construct but deploy many fibers to connect multiple users. As the number of subscribers connected to the network increases, the fiber count also increases rapidly and the expense of deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. Each subscriber may be connected to the network utilizing a much shorter fiber span forming an architecture sometimes referred to as "tree and branch." One challenge in developing such a PON is utilizing the capacity in the trunk fiber efficiently in order to transmit the maximum possible amount of information on the trunk fiber.

To improve efficiency, PONs have used "time domain multiplexing" by assigning each subscriber on the PON a particular time slot for transmission of its data along the trunk fiber. Each subscriber is allowed to transmit during its assigned time slot, and these slots are synchronized at both the transmitter and receiver such that the receiver knows the time slot (and thus the transmitter) of a transmitted signal. In this way, many transmitters can share the same fiber without fear of multiple transmitters sending data at the same time and confusing the receiver. Standards such as gigabit PON (G-PON) and Ethernet-based PON (E-PON), for example, utilize this time-dependant approach.

Although TDM-PON systems work, the TDM approach is inefficient because the system should allow sufficient time between different transmitter time slots to prevent confusion at the receiving end. Also, noise in this type of system is cumulative across all the transmitters in the PON. To avoid unwanted noise, transmitters other than the one currently transmitting may be turned off and then turned on rapidly when it is time to transmit data, without providing much stabilization time. This "burst mode" transmission makes it challenging to increase data rates in a TDM-PON system.

TDM also does not make efficient use of the bandwidth available on the fiber. Optical fiber has the ability to carry many different signals simultaneously, without interfering, as long as these different signals are carried on different wavelengths. TDM-PON systems utilize only a few wavelengths and therefore do not utilize much of the fundamental bandwidth available on the optical fiber. Similar to radio transmissions utilizing different frequencies to carry different signals, fiber optic communications networks may increase the amount of information carried on a single optical fiber by multiplexing different optical signals on different wavelengths using wavelength division multiplexing (WDM).

In a WDM-PON, a single trunk fiber carries data to and from an optical branching point and the branching point provides a simple routing function by directing signals of different wavelengths to and from individual subscribers. In this case, each subscriber is assigned a particular wavelength on which to send and/or receive data. The WDM-PON thus allows much greater bandwidth because each transmitter is allowed to transmit at a higher data rate and for a longer period of time.

A challenge in a WDM-PON, however, is designing a network that will allow the same transmitter to be used in an optical networking terminal (ONT) at any subscriber location. For ease of deployment and maintenance in a WDM-PON, it is desirable to have a "colorless" ONT whose wavelength can be changed or tuned such that a single device could be used in any ONT on the PON. With a "colorless" ONT, an operator only needs to have a single, universal transmitter or transceiver device that can be employed at any subscriber location.

One or more tunable laser sources may be used to provide multiple optical signals at different wavelengths in a WDM system or network such as a WDM-PON. Similar to a tuner section of a radio transmitter allowing the transmitter to select the frequency on which to transmit, a tunable laser has the capability to select different wavelengths on which to transmit optical signals. Various different types of tunable lasers have been developed over the years, but most of these were developed for high-capacity backbone connections to achieve high performance and at a relatively high cost. Many tunable laser sources rely on continuous tuning mechanisms and may be difficult and expensive to construct because of extremely tight manufacturing tolerances. Many continuously tunable lasers also require an external means to "lock" the wavelength similar to a phase-locked loop or crystal reference oscillator in a radio tuner. These wavelength lockers are used because the continuously tunable designs are often highly sensitive to external conditions that can cause the wavelength to drift if not corrected. Conditions such as temperature or external electrical or magnetic fields, for example, can cause drift in some continuously-tunable laser designs.

Many WDM-PON applications have lower data rates and shorter transmission distances as compared to high-capacity, long-haul WDM systems, and thus a lower performance and lower cost laser may suffice. Also, continuous tuning may not be necessary in WDM-PON applications, although the ability to select a wavelength from among several wavelengths (e.g., in a grid of channel wavelengths) is desirable. In some of these applications, the wavelength may be selected only once in the lifetime of the laser (i.e., when it is initially installed) and this wavelength may not need to be changed again.

BRIEF DESCRIPTION OF THE DRAWINGS

These and other features and advantages will be better understood by reading the following detailed description, taken together with the drawings wherein:

FIG. 2 is a functional block diagram of a wavelength division multiplexed (WDM) passive optical network (PON)

including an optical line terminal (OLT) and optical networking terminals (ONTs) with one or more laser mux assemblies, consistent with embodiments of the present disclosure.

DETAILED DESCRIPTION

A laser mux assembly, consistent with embodiments described herein, generally includes at least one back reflector selectively coupled to one of the input ports of an optical multiplexer, such as an arrayed waveguide grating (AWG), and at least one laser emitter coupled to an output port. The laser emitter may include a gain region that emits light across a plurality of wavelengths including, for example, channel wavelengths in an optical communication system. The emitted light is coupled into the output port and the AWG or optical multiplexer filters the emitted light from the laser emitter at different channel wavelengths. The back reflector reflects the filtered light at the respective channel wavelength such that lasing occurs at the channel wavelength of the reflected, filtered light. The laser mux assembly may be used, for example, in a tunable transmitter, to generate an optical signal at a selected channel wavelength.

The laser mux assembly may be used in optical transmitters in a wavelength division multiplexed (WDM) optical system. A wavelength-selectable laser mux assembly may be used, for example, in a tunable transmitter or transceiver in a WDM system such as an optical networking terminal (ONT) or optical networking unit (ONU) in a WDM passive optical network (PON) to select the appropriate transmission channel wavelength for the ONT/ONU.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like by which signals carried by one system element are imparted to the "coupled" element and "optically coupled" refers to coupling such that light from one element is imparted to another element. Such "coupled" devices are not necessarily directly connected to one another and may be separated by intermediate components or devices that may manipulate or modify such signals.

Figure 1:
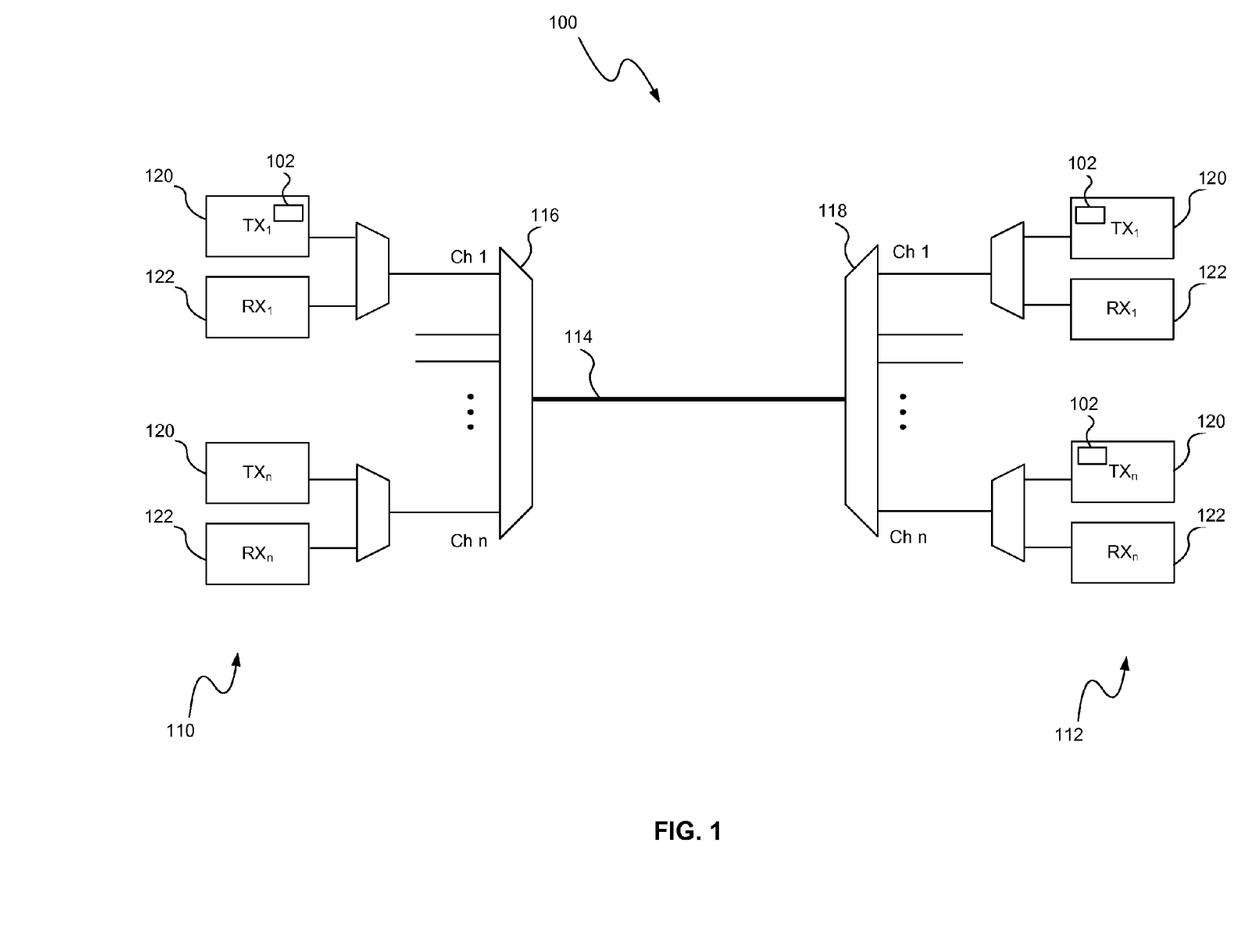
FIG. 1 is a functional block diagram of a wavelength division multiplexed (WDM) optical communication system including one or more laser mux assemblies, consistent with an embodiment of the present disclosure.

Referring to FIG. 1, a WDM optical communication system 100 including one or more laser mux assemblies 102, consistent with embodiments of the present disclosure, is shown and described. The WDM system 100 includes one or more terminals 110, 112 coupled at each end of a trunk optical fiber or path 114 for transmitting and receiving optical signals at different channel wavelengths over the trunk optical path 114. The terminals 110, 112 at each end of the WDM system 100 include one or more transmitters 120 (e.g., $TX_1$ to $TX_n$) and receivers 122 (e.g., $RX_1$ to $RX_n$) associated with different channels (e.g., Ch. 1 to Ch. n) for transmitting and receiving optical signals at the different channel wavelengths between the one or more terminals 110, 112.

Each terminal 110, 112 may include one or more transmitters 120 and receivers 122, and the transmitters 120 and receivers 122 may be separate or integrated as a transceiver within a terminal. Optical multiplexers/demultiplexers 116, 118 at each end of the WDM system 100 combine and separate the optical signals at the different channel wavelengths. Aggregate WDM optical signals including the combined channel wavelengths are carried on the trunk optical path 114. One or more of the transmitters 120 may be tunable transmitters capable of being tuned to the appropriate channel wavelength using a wavelength-selectable laser mux assembly 102. Thus, the transmitters 120 may be constructed as universal, tunable transmitters capable of being used in different locations in the WDM system 100 and tuned to the appropriate channel wavelength depending upon the location in the WDM system 100.

Figure 2:
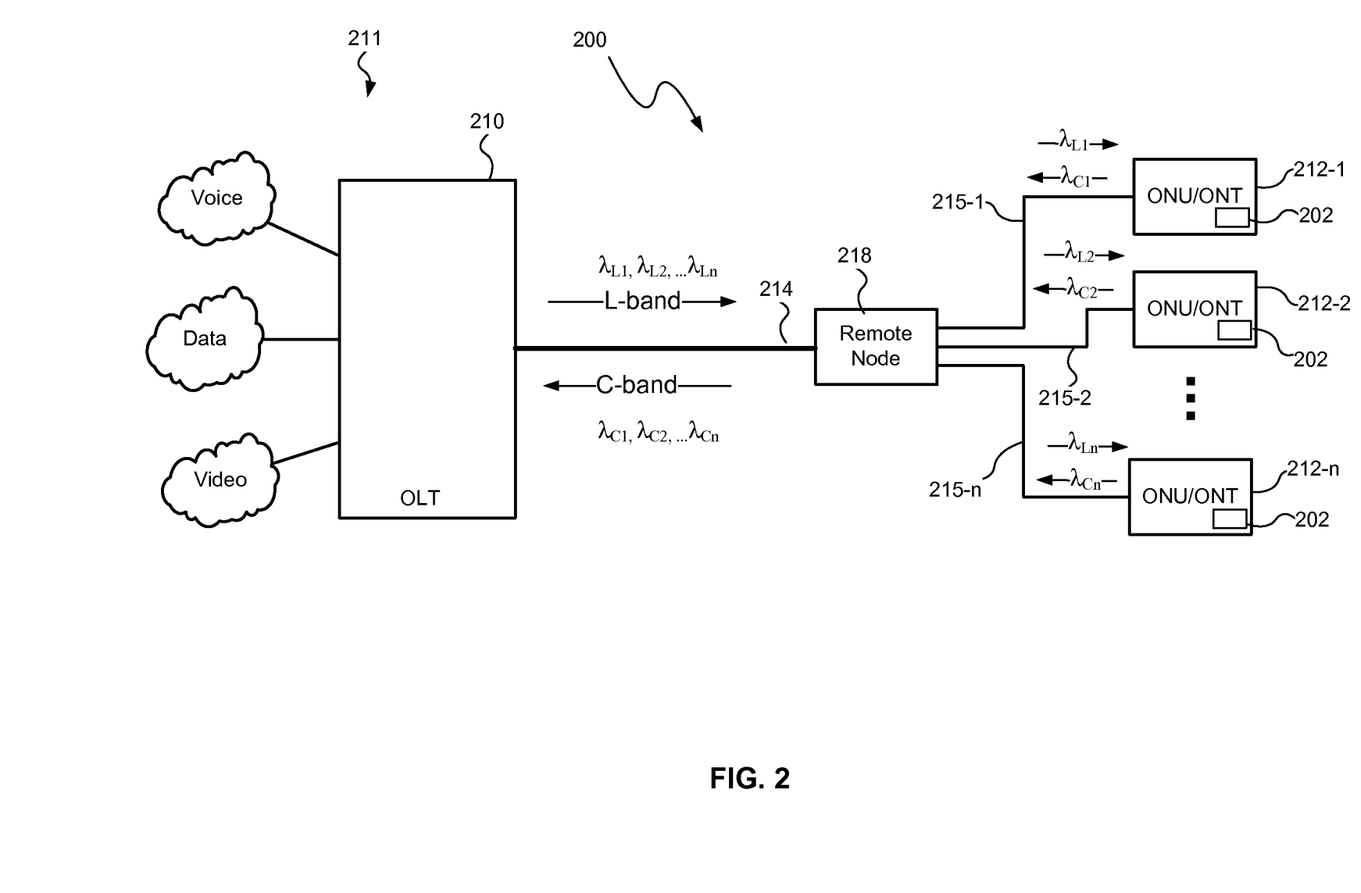

Referring to FIG. 2, one or more laser mux assemblies 202, consistent with embodiments of the present disclosure, may be used in transmitters and/or transceivers in a WDM-PON 200. The WDM-PON 200 provides a point-to-multipoint optical network architecture using a WDM system. According to one embodiment of the WDM-PON 200, a central office (CO) 211 including one or more optical line terminals (OLTs) 210 may be coupled to a plurality of optical networking terminals (ONTs) or optical networking units (ONUs) 212-1 to 212-n via optical fibers, waveguides, and/or paths 214, 215-1 to 215-n. A branching point 218 couples the trunk optical path 214 to the separate optical paths 215-1 to 215-n to the ONUs/ONTs 212-1 to 212-n at the subscriber locations. The branching point 218 may include one or more passive coupling devices such as a splitter or optical multiplexer/demultiplexer. The ONUs/ONTs 212-1 to 212-n may be located in homes, businesses or other types of subscriber location or premises.

The WDM-PON 200 may also include additional nodes or network devices, such as Ethernet PON (EPON) or Gigabit PON (GPON) nodes or devices, coupled between the branching point 218 and ONUs/ONTs 212-1 to 212-n at different locations or premises. One application of the WDM-PON 200 is to provide fiber-to-the-home (FTTH) or fiber-to-the-premises (FTTP) capable of delivering voice, data, and/or video services across a common platform. In this application, the CO 211 may be coupled to one or more sources or networks providing the voice, data and/or video.

In the WDM-PON 200, different ONUs/ONTs 212-1 to 212-n may be assigned different channel wavelengths and optical signals may be transmitted on the different channel wavelengths and combined and separated using WDM techniques. One or more of the ONUs/ONTs 212-1 to 212-n may thus include a wavelength-selectable laser mux assembly 202 for generating an optical signal at a selected channel wavelength assigned for transmission. The OLT 210 may be configured to generate multiple optical signals at different channel wavelengths and to combine the optical signals into an aggregate WDM optical signal carried on the trunk optical fiber or path 214.

In one embodiment, the WDM-PON 200 may use different wavelength bands for transmission of downstream and upstream optical signals relative to the OLT 210. For example, the L-band (e.g., about 1565 to 1625 nm) may be used for downstream transmissions and the C-band (e.g., about 1530 to 1565 nm) may be used for upstream transmissions. The ONUs/ONTs 212-1 to 212-n may thus be assigned different channel wavelengths within the L-band and within the C-band. Transceivers or receivers located within the ONUs/ONTs 212-1 to 212-n may be configured to receive an optical signal on at least one channel wavelength in the L-band. Transceivers or transmitters located within the ONUs/ONTs 212-1 to 212-n may be configured to transmit an optical signal on at least one channel wavelength in the C-band. Other wavelengths and wavelength bands are also within the scope of the system and method described herein.

In the example embodiment, the OLT 110 may generate optical signals at the different respective channel wavelengths in the L-band (e.g., $\lambda_{L1}$, $\lambda_{L2}$, ... $\lambda_{Ln}$) and combine those optical signals as an aggregate WDM optical signal. The branching point 218 may demultiplex the downstream aggregate WDM optical signal (e.g., $\lambda_{L1}$, $\lambda_{L2}$, ... $\lambda_{Ln}$) from the OLT 210 for transmission of the separate channel wavelengths to the respective ONUs/ONTs 212-1 to 212-n. Alternatively, the branching point 218 may provide the aggregate WDM optical signal to each of the ONUs/ONTs 212-1 to 212-n and each of the ONUs/ONTs 212-1 to 212-n separates and processes the assigned optical channel wavelength. The individual optical signals may be encrypted to prevent eavesdropping on optical channels not assigned to a particular ONU/ONT.

In the example embodiment, the wavelength-selectable laser mux assembly 202 in one or more of the ONUs/ONTs 212-1 to 212-n may generate an optical signal at a selected one of the channel wavelengths in the C-band (e.g., $\lambda_{C1}$, $\lambda_{C2}$, ... $\lambda_{Cn}$). In particular, the laser emitter in the laser mux assembly 202 is modulated by an RF signal and a back reflector reflects the light of a selected channel wavelength at a selected input port of an AWG. The branching point 218 combines or multiplexes the upstream optical signals from the respective ONUs/ONTs 212-1 to 212-n for transmission as an aggregate WDM optical signal over the trunk optical path 214 to the OLT 210.

Although examples of WDM systems are illustrated, laser mux assemblies, consistent with embodiments described herein, may also be used in other types of optical systems. A wavelength-selectable laser mux assembly may be used, for example, to scan across a range of wavelengths in spectroscopy applications to analyze different absorption characteristics of a gas.

Figure 3:
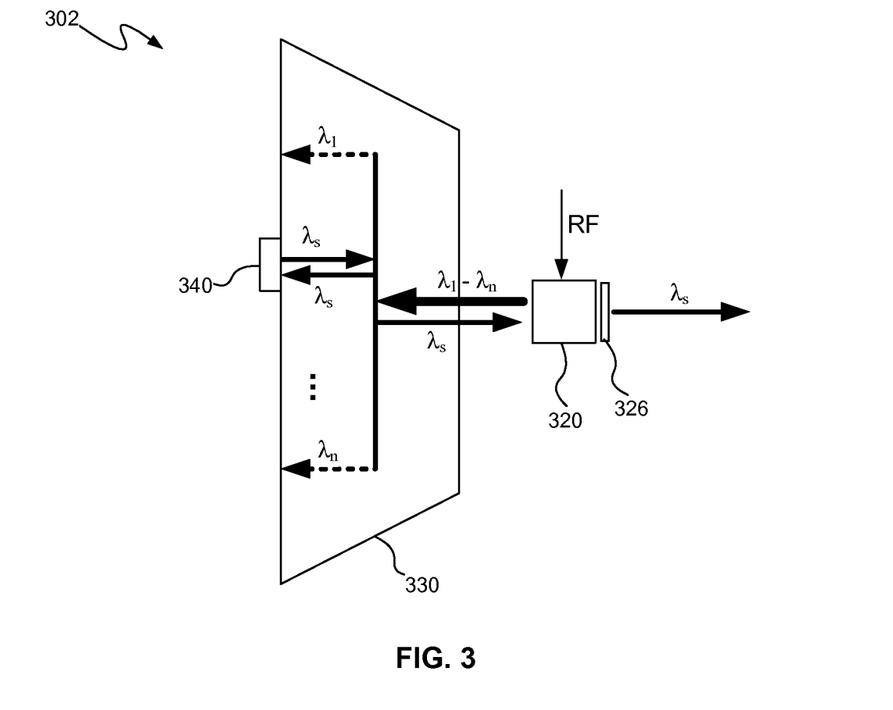
FIG. 3 is a schematic diagram of a wavelength-selectable laser mux assembly, consistent with embodiments of the present disclosure.

FIG. 3 illustrates operation of a laser mux assembly 302, consistent with embodiments of the present disclosure, for providing a selected wavelength. The wavelength-selectable laser mux assembly 302 includes at least one back reflector 340 coupled to one of the input ports of an optical multiplexer 330, a laser emitter 320 optically coupled to an output port of the optical multiplexer 330, and a front or exit reflector 326. The laser emitter 320 is configured to emit light across a range of wavelengths including the channel wavelengths (e.g., $\lambda_1$ to $\lambda_n$) of an optical communication system. The light emitted from the laser emitter 320 is coupled into the optical multiplexer 330, and the optical multiplexer 330 (e.g., an AWG) filters the emitted light from the laser emitter 320 at different channel wavelengths and passes the different channel wavelengths (e.g., $\lambda_1$, $\lambda_2$, ... $\lambda_n$) to the respective input ports. Thus, the different channel wavelengths (e.g., $\lambda_1$, $\lambda_2$, ... $\lambda_n$) are associated with respective input ports of the optical multiplexer 330. The back reflector 340 reflects the filtered light from one of the input ports, back through the optical multiplexer 330 and into a gain region of the respective laser emitter 320 such that a lasing cavity is formed between the back reflector 340 and the front reflector 326.

The wavelength-selectable laser mux assembly 302 may select a channel wavelength ($\lambda_s$) for transmission by reflecting the filtered light from a selected one of the input ports of the optical multiplexer 330. To select a selected channel wavelength ($\lambda_s$), for example, the back reflector 340 reflects the filtered light from the input port associated with the selected channel wavelength ($\lambda_s$) such that a lasing cavity is formed between the back reflector 340 and the front reflector 326 and lasing occurs at the selected channel wavelength ($\lambda_s$). When lasing occurs, the selected channel wavelength ($\lambda_s$) passes through the front reflector 326, thereby producing an optical signal at the selected channel wavelength ($\lambda_s$).

The wavelength-selectable laser mux assembly 302 may thus be used in a tunable optical transmitter (e.g., in the ONT/ONUs of a WDM-PON), allowing universal, colorless transmitters capable of changing the selected wavelength without using conventional tunable lasers. By lasing only at the selected channel wavelength, the tunable transmitters may be more efficient than transmitters including Fabry Perot (FP) lasers that lase across multiple channel wavelengths and then later filter and select a wavelength.

Figure 4:
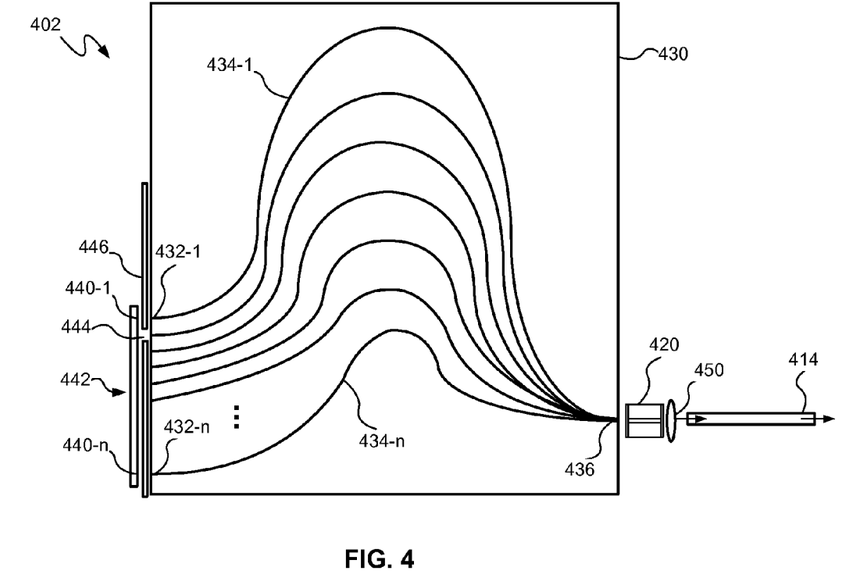
FIG. 4 is a schematic diagram of one embodiment of a laser mux assembly using an arrayed waveguide grating (AWG).

Referring to FIG. 4, one embodiment of a wavelength-selectable laser mux assembly 402 is shown and described in greater detail. The laser mux assembly 402 includes an arrayed waveguide grating (AWG) 430 with waveguides 434-1 to 434-n extending from respective input ports 432-1 to 432-n to output port 436. Back reflectors 440-1 to 440-n are selectively coupled to the input ports 432-1 to 432-n and a laser emitter 420 is coupled to the output port 536. The laser output is coupled to an optical fiber or waveguide 414, for example, through a lens 450 or other optics.

The AWG 430 may include existing AWGs that provide the desired channel wavelengths on the respective waveguides 434-1 to 434-n, effectively filtering the light passing through the AWG 430. The AWG 430 may be a dense WDM (DWDM) AWG with sixteen AWG inputs and waveguides for 16 channels, although other AWG configurations with other numbers of channels are within the scope of the present disclosure. Although the example embodiment shows an AWG, a laser mux assembly may also include other types of optical multiplexers capable of filtering light at different channel wavelengths associated with different respective input ports of the optical multiplexer.

In the illustrated embodiment, the back reflectors 440-1 to 440-n are provided by reflective regions on a mirror 442 that extends across the AWG input ports 432-1 to 432-n, which may be selected for reflection through a light passage region 444 in a light blocking member 446. The light blocking member 446 may be positioned such that the light passage region 444 is located at one of the back reflectors 440-1 to 440-n coupled to one of the AWG input ports 432-1 to 432-n associated with the selected channel wavelength. Thus, the light at the selected channel wavelength is allowed to pass through the light passage region 444 and reflect from the respective one of the back reflectors 440-1 to 440-n into the respective one of the waveguides 434-1 to 434-n. The back reflectors 440-1 to 440-n may be highly reflective (e.g., at least 80% reflective). Although the back reflectors 440-1 to 440-n are shown as reflective regions on the single mirror 442, the back reflectors 440-1 to 440-n may also include separate reflectors or mirrors positioned adjacent each of the AWG input ports 432-1 to 432-n.

Although the light passage region 444 is shown as an aperture through a movable plate, the light blocking member 446 may include any structure capable of allowing light to pass through one region adjacent one of the AWG input ports 432-1 to 432-n while blocking the passage of light from the other AWG input ports. The light blocking member may include, for example, a coating on the back reflectors 440-1 to

440-$n$, which is capable of blocking the reflecting locations. By obscuring certain reflectors 440-1 to 440-$n$, the laser cavity is only sufficiently reflective to achieve lasing at the wavelength selected by the non-opaque light passage region of the coating, thereby effectively selecting a channel wavelength. The back reflectors 440-1 to 440-$n$ may be coated, for example, with a polymer material that becomes opaque or less reflective around the laser wavelength(s) when heated above a particular temperature. Small heating elements (not shown) may be embedded behind the back reflectors 440-1 to 440-$n$ to allow an external current to be employed to locally heat the coated back reflectors 440-1 to 440-$n$ such that certain regions become opaque and the light passage region is left non-opaque.

Figure 5:
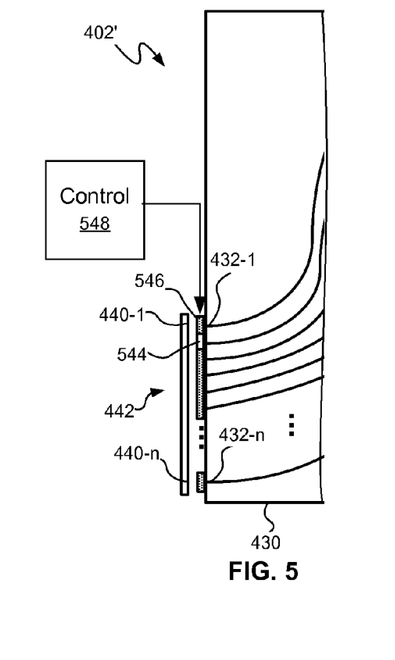
FIG. 5 is a schematic diagram of another embodiment of a laser mux assembly using an arrayed waveguide grating (AWG).

According to another embodiment of the wavelength-selectable laser mux assembly 402', as shown in FIG. 5, the light blocking member includes a pixelated spatial filter 546 capable of selectively blocking the reflectors 440-1 to 440-$n$ by forming opaque regions. By interposing this spatial filter 546 between the back reflectors 440-1 to 440-$n$ and the AWG input ports 432-1 to 432-$n$, the laser cavity is only sufficiently reflective for lasing at the wavelength selected by the non-opaque light passage region 544 of the spatial filter 546, thereby effectively selecting certain wavelengths for the output of the laser. The spatial filter 546 may be controlled such that the spatial filter is opaque except for a region passing the selected wavelength $\lambda_s$, which is reflected back to the laser emitter 420, resulting in a laser output at the spatially selected wavelength $\lambda_s$.

The pixelated spatial filter 546 may include, for example, a liquid crystal or patterned semiconductor pixel array that may be controlled to select the opaque and non-opaque regions. For example, an Indium Gallium Arsenide Phosphide (InGaAsP) crystal with electrodes can be made to be locally opaque between the electrodes by the application of an electrical field. The electrodes may be modulated, therefore, to make certain regions of the crystal opaque while others are transmissive. Alternative spatial filters may include liquid crystals, birefringent crystals, optical polymers, or the like. Tuning may also be accomplished by heating, applied electric fields, magnetic fields, light absorption, current flow, or the like. This embodiment may also include a control 548 that allows the selected wavelength $\lambda_s$ to be changed by controlling the spatial filter 546 to form different non-opaque regions. The control 548 may include control circuitry coupled to the spatial filter 546, for example, to apply an electrical field to different electrodes such that a desired wavelength is selected.

Figure 6:
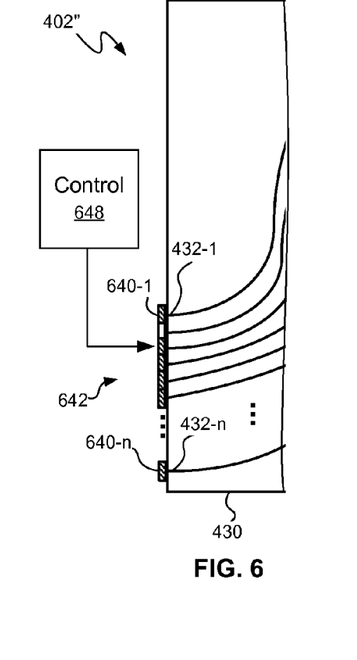
FIG. 6 is a schematic diagram of a further embodiment of a laser mux assembly using an arrayed waveguide grating (AWG).

Referring to FIG. 6, another embodiment of a wavelength-selectable laser mux assembly 402" includes back reflectors 640-1 to 640-$n$ in the form of a mirror array 642 with selectively reflecting regions located adjacent each of the AWG input ports 432-1 to 432-$n$. The mirror array 642 may include a microelectromechanical system (MEMS) mirror array. A control 648, such as control circuitry, may be coupled to the mirror array 642 and used to control the regions of the mirror array 642 that are reflective to select the desired wavelength.

In further embodiments, the back reflector may include a single back reflector configured to move to a selected one of the input ports.

Figure 7:
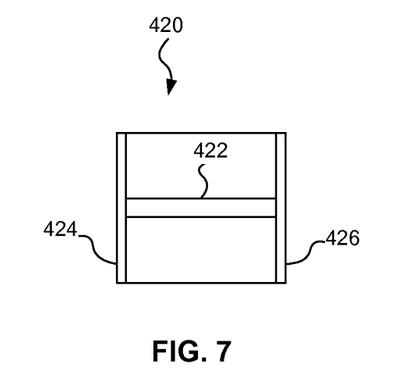
FIG. 7 is a schematic diagram of a gain chip that may be used in the laser mux assembly.

As shown in FIG. 7, each laser emitter 420 includes a gain region 422 that generates light across the range of wavelengths and amplifies the reflected light at the associated channel wavelength to provide the gain that results in lasing when the gain exceeds the cavity losses. This embodiment of the laser emitter 420 also includes an anti-reflective coating 424 on a back side coupled to the AWG 430 and a front reflector 426 on an opposite side. The front reflector 426 reflects light from the laser emitter 420 back into the AWG 430 and the anti-reflective coating 424 allows light to pass between the AWG 430 and the gain region 422 of the laser emitter 420.

Each laser emitter 420 may include multiple quantum-well active regions or other gain media capable of emitting a spectrum of light across a range of wavelengths and capable of amplifying light reflected back into the gain media. The laser emitter 420 may be, for example, a laser or gain chip such as a semiconductor or diode laser (e.g., Fabry-Perot (FP) diode laser). The anti-reflective coating 424 may have a reflectivity as small as possible (e.g., less than 1% reflective).

Figure 8:
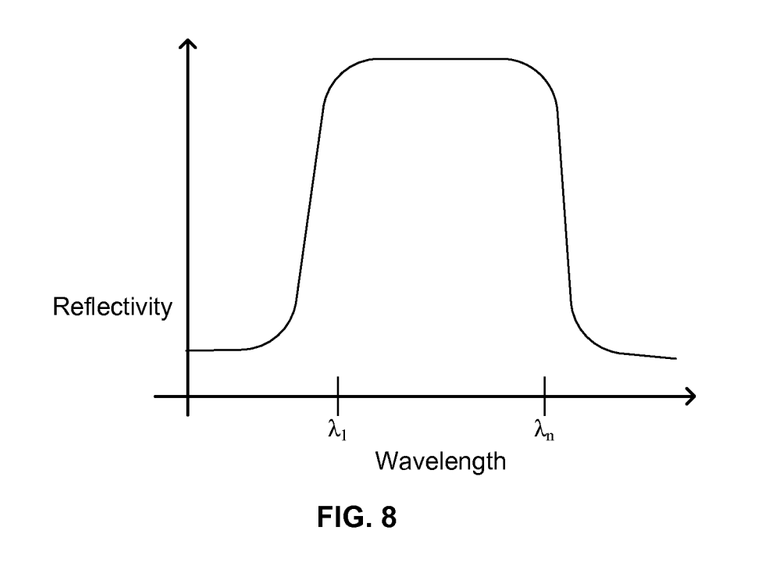
FIG. 8 illustrates the reflectivity characteristics of a reflector that may be used in the laser mux assembly.

The front reflector 426 may be partially reflective (e.g., about 50% reflective) and may include a cleaved facet on a laser or gain chip, a partially reflective coating on the chip, a thin film reflector, or a distributed Bragg reflector (DBR) on the gain chip or separate from the gain chip. The partial front reflector 426 may provide about 50% reflectivity across the channel wavelengths ($\lambda_1$ to $\lambda_n$), as shown in FIG. 8. The partial front reflector 426 thus acts as an exit mirror that completes the lasing cavity. Although the laser emitter 420 is shown with the front reflector 426 as part of the laser emitter 420, an external front reflector (e.g., a fiber Bragg grating) may also be used.

Accordingly, a laser mux assembly, consistent with embodiments of the present disclosure, may be used advantageously in tunable optical transmitters that transmit optical signals at a selected channel wavelength. Using an optical multiplexer, such as an AWG, to lock in the one or more channel wavelengths, for example, avoids using complicated external wavelength locking and controls.

Consistent with an embodiment, a laser mux assembly includes an optical multiplexer including a plurality of input ports and an output port. The optical multiplexer is configured to filter light received on each of the input ports at different respective channel wavelengths for each of the input ports and to provide the filtered light to the output port. The laser mux assembly also includes a laser emitter including a gain region for emitting light across a range of wavelengths including a plurality of channel wavelengths. The laser emitter is coupled to the output port such that the emitted light is coupled into the output port and passes to the input ports. The laser mux assembly further includes a front reflector configured to reflect at least a portion of light from the gain region of the laser emitter back to the output port of the optical multiplexer and at least one back reflector coupled to a selected one of the input ports. The back reflector is configured to reflect the filtered light from the selected one of the input ports back to the gain region in the laser emitter such that a lasing cavity is formed between the back reflector and the front reflector and lasing occurs at the channel wavelength reflected back to the gain region of the laser emitter.

Consistent with another embodiment, a wavelength division multiplexed (WDM) system includes a plurality of terminals associated with different respective channel wavelengths and configured to transmit optical signals on the different respective channel wavelengths. At least one of the plurality of terminals includes at least a tunable optical transmitter configured to be tuned to a respective one of the channel wavelengths. The tunable optical transmitter includes a wavelength-selectable laser mux assembly configured to transmit an optical signal at the selected one of the channel wavelengths. The laser mux assembly includes an optical multiplexer including a plurality of input ports and an output port and configured to filter light received on each of the input ports at different respective channel wavelengths for each of the input ports and to provide the filtered light to the output port. The laser mux assembly also includes a laser emitter including a gain region for emitting light across a range of wavelengths including a plurality of channel wavelengths. The laser emitter is coupled to the output port such that the emitted light is coupled into the output port and passes to the input ports. The laser mux assembly further includes a front reflector configured to reflect at least a portion of light from the gain region of the laser emitter back to the output port of the optical multiplexer and at least one back reflector coupled to a selected one of the input ports. The back reflector is configured to reflect the filtered light from the selected one of the input ports back to the gain region in the laser emitter such that a lasing cavity is formed between the back reflector and the front reflector and lasing occurs at the channel wavelength reflected back to the gain region of the laser emitter.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser mux assembly comprising: an optical multiplexer including a plurality of input ports and an output port, the optical multiplexer being configured to filter light received on each of the input ports at different respective channel wavelengths for each of the input ports and to provide the filtered light to the output port; a laser emitter including a gain region for emitting light across a range of wavelengths including a plurality of channel wavelengths, the laser emitter coupled to the output port such that the emitted light is coupled into the output port and passes to the input ports; a front reflector configured to reflect at least a portion of light from the gain region of the laser emitter back to the output port of the optical multiplexer; and at least one back reflector selectively coupled to a selected one of the input ports, wherein the back reflector is configured to selectively reflect the filtered light from the selected one of the input ports back to the gain region in the laser emitter such that a lasing cavity is formed between the back reflector and the front reflector and within the optical multiplexer and lasing occurs at the channel wavelength reflected through the optical multiplexer back to the gain region of the laser emitter, and wherein the optical multiplexer, the front reflector and the at least one back reflector are configured to form a plurality of selectable lasing cavities for lasing at the different respective channel wavelengths; wherein the front reflector includes a partial reflector on a front side of the laser emitter, and wherein the laser emitter is anti-reflective on a back side optically coupled to the output port.

2. The laser mux assembly of claim 1 wherein the laser emitter include a Fabry Perot (FP) laser.

3. The laser mux assembly of claim 1 wherein the optical multiplexer is an arrayed waveguide grating (AWG) including a plurality of waveguides optically coupled between the input ports, respectively, and the output port.

4. The laser mux assembly of claim 1 further comprising a light blocking member including a light passage region to allow light from the selected one of the input ports to reflect from the back reflector and configured to prevent light from reflecting from the back reflector at others of the input ports.

5. The laser mux assembly of claim 4 wherein the back reflector includes a reflective region on a mirror extending across each of the input ports.

6. The laser mux assembly of claim 4 wherein the light blocking member includes a plate with a movable aperture.

7. The laser mux assembly of claim 4 wherein the light blocking member includes a pixelated spatial filter configured to selectively provide opaque and non-opaque regions.

8. The laser mux assembly of claim 1 wherein the back reflector is configured to move to the selected one of the input ports.

9. The laser mux assembly of claim 1 wherein the back reflector includes a reflective portion of a mirror array, wherein the mirror array is configured to selectively reflect light from reflective portions of the mirror array.

10. The laser mux assembly of claim 1 wherein the plurality of wavelengths include wavelengths in the C-band.

11. A wavelength division multiplexed (WDM) system comprising: a plurality of terminals associated with different respective channel wavelengths and configured to transmit optical signals on the different respective channel wavelengths, at least one of the plurality of terminals including at least a tunable optical transmitter configured to be tuned to a respective one of the channel wavelengths, the tunable optical transmitter comprising a wavelength-selectable laser mux assembly configured to transmit an optical signal at the selected one of the channel wavelengths, the laser mux assembly comprising: an optical multiplexer including a plurality of input ports and an output port, the optical multiplexer being configured to filter light received on each of the input ports at different respective channel wavelengths for each of the input ports and to provide the filtered light to the output port; a laser emitter including a gain region for emitting light across a range of wavelengths including a plurality of channel wavelengths, the laser emitter coupled to the output port such that the emitted light is coupled into the output port and passes to the input ports; a front reflector configured to reflect at least a portion of light from the gain region of the laser emitter back to the output port of the optical multiplexer; and at least one back reflector selectively coupled to a selected one of the input ports, wherein the back reflector is configured to selectively reflect the filtered light from the selected one of the input ports back to the gain region in the laser emitter such that a lasing cavity is formed between the back reflector and the front reflector and within the optical multiplexer and lasing occurs at the channel wavelength reflected through the optical multiplexer back to the gain region of the laser emitter, and wherein the optical multiplexer, the front reflector and the at least one back reflector are configured to form a plurality of lasing cavities for lasing at the different respective channel wavelengths; wherein the front reflector includes a partial reflector on a front side of the laser emitter, and wherein the laser emitter is anti-reflective on a back side optically coupled to the output port.

12. The WDM system of claim 11 wherein the plurality of terminals include optical networking terminals (ONTs) in a WDM passive optical network (PON).

13. The WDM system of claim 11 further comprising:
at least one optical line terminal (OLT) configured to receive aggregate WDM optical signals including the channel wavelengths;
at least one branching point coupled between the OLT and the plurality of terminals, the branching point being configured to combine the optical signals at the channel wavelengths; and
a trunk optical path coupling the OLT and the branching point.

14. The WDM system of claim 11 wherein the optical multiplexer is an arrayed waveguide grating (AWG) including a plurality of waveguides optically coupled between the input ports, respectively, and the output port.

15. The WDM system of claim 11 wherein the channel wavelengths include wavelengths in the C-band.

16. The WDM system of claim 11 further comprising a light blocking member including a light passage region to allow light from the selected one of the input ports to reflect from the back reflector and configured to prevent light from reflecting from the back reflector at others of the input ports.

17. The WDM system of claim 16 wherein the back reflector includes a reflective region on a mirror extending across each of the input ports.

18. The WDM system of claim 11 wherein the back reflector is configured to move to the selected one of the input ports.

19. The WDM system of claim 11 wherein the back reflector includes a reflective portion of a mirror array, wherein the mirror array is configured to selectively reflect light from reflective portions of the mirror array.

\* \* \* \* \*